Oct. 30, 1956  W. P. BURTON ET AL  2,768,933
REFORMING PROCESS
Filed Oct. 29, 1952
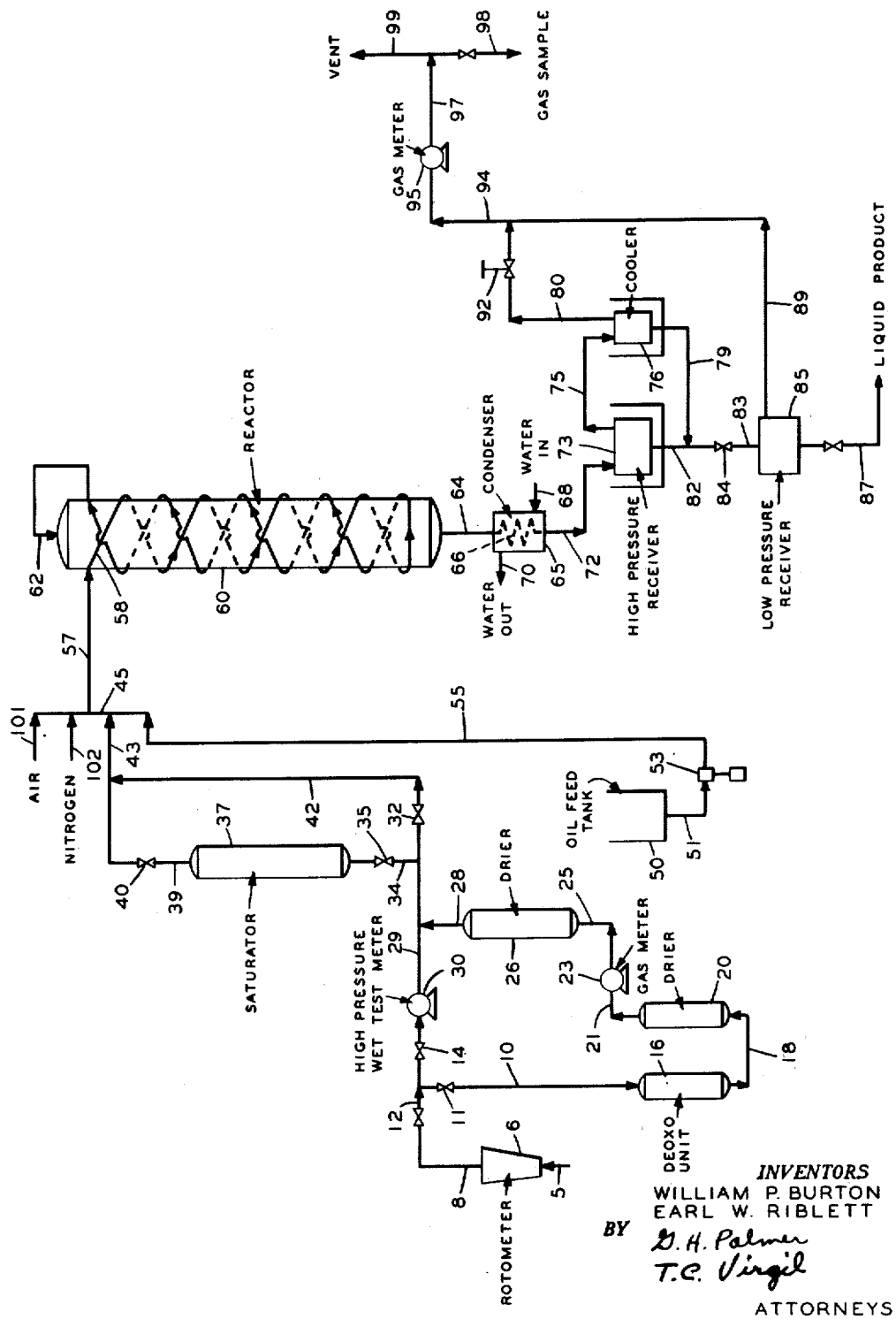
INVENTORS
WILLIAM P. BURTON
EARL W. RIBLETT
BY D. H. Palmer
T. C. Virgil
ATTORNEYS

United States Patent Office 2,768,933
Patented Oct. 30, 1956

2,768,933

REFORMING PROCESS

William P. Burton, Little Silver, and Earl W. Riblett, Tenafly, N. J., assignors to The M. W. Kellogg Company, Jersey City, N. J., a corporation of Delaware Application October 29, 1952, Serial No. 317,504

12 Claims. (Cl. 196—50)

This invention relates to an improved method of reforming light hydrocarbon oils, and more particularly pertains to an improved method of reforming naphtha fractions involving a pre-conditioned molybdenum oxide catalyst.

It is an object of this invention to provide an improved method of reforming light hydrocarbon oils to gasoline products of high anti-knock quality.

Another object of this invention is to provide an improved method of reforming naphtha fractions to gasoline products of high anti-knock quality.

Still another object of this invention is to provide an improved method of reforming light hydrocarbon oils involving the preconditioning of a molybdenum oxide catalyst.

A further object of this invention is to provide an improved method of reforming light hydrocarbon oils to gasoline products of high anti-knock quality by employing a preconditioned molybdenum oxide catalyst and effecting the reforming operation in the presence of a small amount of water.

Other objects and advantages of this invention will become apparent from the following description and explanation thereof.

In accordance with this invention an improved process for reforming light hydrocarbon oils is obtained by the method which comprises preconditioning a molybdenum oxide catalyst which has been calcined at a temperature of at least about 1250° F. by treatment with a hydrogen containing gas at an elevated temperature, with or without the presence of a small amount of water, and then employing the catalyst for the reforming operation, with or without the presence of a small amount of water.

The catalyst employed for the purposes of this invention comprises molybdenum oxide, either alone, or supported on a carrier material. The carrier material can include, for example, alumina, silica, silica-alumina, magnesia, silica-magnesia, alumina-magnesia, pumice, kieselguhr, Fuller's earth, "Superfiltrol," bentonite clays, etc. A particularly effective catalyst is molybdenum trioxide supported on alumina with or without an additional carrier material, such as a small amount of silica. Generally, the catalytic agent of the catalyst, namely, molybdenum oxide comprises about 0.5 to about 24% by weight of the total catalyst, more usually, it constitutes about 1 to about 20% by weight of the catalyst. A small amount of silica is preferably used in combination with alumina as the supporting material, because it enhances the stability of the catalyst at elevated temperatures, and further, in some cases, it increases the activity and/or selectivity of the catalyst after continued use. The silica is employed in amounts of about 0.5 to about 12%, more usually, about 2 to about 8% by weight, based on the total catalyst. For the purposes of this invention, it is preferred to employ an alumina containing carrier material because of the exceptionally good results which are obtained therewith in reforming light hydrocarbon oils.

The catalyst employed for the purposes of this invention can be prepared by a variety of methods. Examples of the methods of preparation will be given in connection with molybdenum oxide supported on alumina with or without the presence of a small amount of silica. In the preparation of the catalyst, aluminum; water; an acid, such as formic acid, acetic acid or hydrochloric acid; and mercury or mercuric oxide are reacted under suitable conditions and proportions to obtain a hydrous alumina or alumina sol. The alumina sol can then be treated with an alkaline reagent, e. g., ammonium hydroxide, in order to effect a gelation. Molybdenum trioxide is dissolved in ammonium hydroxide to produce ammonium molybdate. The ammonium molybdate solution can be added to the alumina sol or gel as such or such aluminas can be either dried and/or calcined prior to being combined with the ammonium molybdate. In the treatment of the alumina sol with an alkaline reagent, it is desirable to adjust the pH to a value between about 5 to about 12.

Another method for preparing alumina involves reacting aluminum, water and mercury or mercuric oxide at an elevated temperature, preferably at the boiling point of the solution, and then combining with the alumina thus produced, with or without treatment by means of an alkaline reagent, the ammonium molybdate solution. Here again, the alumina obtained by this method can be used as such or it can be dried and/or calcined prior to being combined with the ammonium molybdate. The alumina can also be prepared by precipitating alumina gel from an aluminum salt, e. g., aluminum chloride, aluminum sulfate, aluminum nitrate, etc., by means of an alkaline reagent, e. g., ammonium hydroxide. The gel thus produced can be used as such or it can be further treated with an alkaline reagent, e. g., ammonium hydroxide, with or without aging for a suitable period of time. In all of the alumina preparations which can be used for the purposes of this invention, the alumina can be aged, with or without treatment by means of an alkaline reagent, e. g., ammonium hydroxide, prior to being dried and/or calcined. The aging period usually requires at least about 10 hours, more usually, at least about 17 hours.

The precursor material for the molybdenum oxide can also be in the form of molybdic acid, $H_2MoO_4$, which can be combined with the carrier material prior to drying or after drying and/or calcination. The molybdic acid may be prepared by reacting ammonium molybdate with nitric acid.

Another method for preparing the catalyst involves placing the molybdenum trioxide in a suitable vessel which can be heated to a temperature at which the molybdena sublimes. An inert gas, such as nitrogen, is passed through the subliming mass of molybdena in order to carry away the molybdenum trioxide vapors and thence carry same to a zone containing the supporting material at a lower temperature in order to condense the molybdena thereon. In another method of preparation, the carrier material in the form of a salt, e. g., aluminum chloride, is admixed with a molybdate salt, e. g., ammonium molybdate in proper relative quantities and thereafter, hydrazine hydrate is added to the mixture in order to effect co-precipitation of the catalytic components. The methods described hereinabove may be modified to the extent of employing a metallic molybdate salt, such as for example, sodium molybdate, potassium molybdate, etc., provided the introduction of foreign metallic ions is not undesirable.

The carrier material can be present in the form of gamma-alumina, eta-alumina or mixtures of the two in various proportions. Activated alumina is another suitable form of alumina which can be used.

The drying of a catalytic component or a mixture of catalytic components is usually effected at a temperature of not more than about 400° F. and preferably between about 200° and about 250° F. The drying operation is usually effected over a period of about 15 to about 60 hours, during which time the volatile materials are driven off. In order to accelerate the volatilization or the removal of volatile components from the material being dried, it may be desirable to employ sub-atmospheric pressures and as a result, the period of drying can be shortened to within a range of about 2 seconds to 3 hours. After the material has been dried, it is then subjected to a calcination treatment whereby the catalytic agent is transformed to an active form and/or it is distributed in a more desirable manner throughout the carrier material. Normally, a catalyst is calcined at a temperature of about 600° to about 1250° F. The calcination is effected for a period of about 2 to about 15 hours. In the present invention, calcination treatment at a temperature below about 1250° F. produces a catalytic material which is less suitable for a reforming operation involving the preconditioning with a hydrogen containing gas and followed by a reforming step involving the use of a small amount of water. For the purposes of this invention, a catalyst can be prepared using a calcination treatment at a temperature below about 1250° F., however, this catalyst should be further treated in accordance with the present invention in order to obtain improved yields of reformed liquid product. For the purposes of this invention, the catalytic material is calcined at a temperature of at least about 1250° F., or more usually, at a temperature of about 1350° to about 1600° F. At these elevated temperatures, the catalyst is calcined for a period of about 2 to about 20 hours, or more usually, about 3 to about 15 hours.

Following a purging or stripping operation, the catalyst is then contacted with a hydrogen containing gas with or without the presence of small amounts of water vapor. The hydrogen containing gas serves to reduce the molybdenum oxide from a higher to a lower level of oxidation, which lower level is favorable for the pre-reducing operation. This reforming step is conducted at an elevated temperature in the range of about 850° to about 1050° F., and it is preferably conducted at a temperature of about 930° to about 975° F. At a preferred temperature range, it is noted that greater yields of reformed liquid product are obtained than those operations in which the catalyst was prereduced at a temperature outside of the preferred range. The pressure of the pre-reduction step can be at any level which is desired. Accordingly, atmospheric pressure can be used or an elevated pressure including, for example, about 50 to about 750 p. s. i. g. For the reasons advanced hereinabove in connection with the purging step, it is preferred to employ the pre-reduction of catalyst at the pressure at which the reaction cycle is effected. This is particularly advantageous in the case of a fluidized moving bed system. This pre-reduction can be accomplished with dry hydrogen or hydrogen containing small amounts of water namely, in the range of about 0.1 to about 10 mol per cent water, more usually, about 0.5 to about 6 mol per cent, preferably about 2 to about 6 mol per cent, based on the amount of hydrogen employed for the pretreatment. It is noted that better results are obtained when using hydrogen containing small amounts of water. These results involve higher yields of reformed liquid products of high anti-knock quality. The period of time involved in the pre-reduction depends upon the rate at which the catalyst is reduced to the desired oxidation level. The treatment can require about 0.05 to about 4 hours, however, it is noted that short periods of reduction are satisfactory for obtaining higher yields of reformed liquid product. In such cases, it is usually only necessary to conduct the pre-reduction of catalyst for about 0.1 to about 1 hour. The reduction of catalyst is accompanied by an exothermic heat effect. The temperature may increase, for example, about 25° to about 75° F. during the first 2 to 10 minutes of pretreatment. This is highly indicative that a substantial amount of the pre-reduction has already taken place and, therefore, only a small amount of reduction may be possible thereafter. The exothermic heat evolved is advantageous because normally in the reforming step, it is necessary to furnish heat because of the endothermic reactions. The quantity of hydrogen containing gas will depend upon various factors, such as for example, the length of treatment, the pressure at which prereduction is effected. etc. Generally, the entire operation about 10 to about 10,000 standard cubic feet of hydrogen per pound of molybdenum oxide are employed. The hydrogen necessary for this operation can be derived from the reforming operation in which hydrogen is produced as a product of the process. This hydrogen containing gas is usually referred to as the recycle gas of the reforming operation. Normally, this gas contains at least about 35% of hydrogen by volume, more usually, about 50 to about 75% by volume of hydrogen. The remainder of the recycle gas is composed substantially of hydrocarbon materials, predominantly light hydrocarbons having about 1 to 3 carbon atoms. The hydrogen containing gas employed for the pretreatment can also be used for the reforming operation, thus effecting a saving in cost of hydrogen. The system can involve passing a portion of the recycle gas from the reforming operation to the pre-reduction zone, and then circulating the gas from the pre-reduction zone back to the reaction zone, or passing separate recycle streams into the two vessels.

The pre-reduction of catalyst is accomplished in a variety of ways depending upon the type of system which is used for the reforming operation. In a fixed bed system involving lumps, granules, pellets or finely divided particles of catalyst, pre-reduction will follow immediately the purging or stripping cycle while the catalyst remains in situ. In this type of an operation, the pre-reduction can be effected under static conditions. This static condition can be effected at atmospheric pressure or an elevated pressure, for example, at the same pressure level at which the reaction cycle is conducted. At low temperatures of pretreatment, namely, in the range of about 825° to about 925° F. in a fixed bed system, it is preferred to employ a static condition of pretreatment. When a static treatment is operated at a high pressure level, it can also be followed by a depressuring operation, and after which, the system is repressured to a level at which the reaction is to take place. It is also contemplated using a flow condition for a fixed bed system which involves maintaining a net flow of hydrogen containing gas over the catalytic material. The flow rate of hydrogen can be in the range of about 3 to about 1000 standard cubic feet per hour per pound of molybdenum oxide which is present. Furthermore, the flow of hydrogen containing gas can be maintained during the initial stage of pretreatment at a low level in the order of about 3 to about 500 standard cubic feet per hour per pound of molybdenum oxide and for a period of about 0.08 to about 1 hour, after which time, the rate of hydrogen containing gas again is increased to about 10 to about 1500 standard cubic feet per hour per pound of molybdenum oxide for the remainder of the prereduction period. In a fluidized system, the pre-reduction can be accomplished in a separate vessel or the catalyst can be removed from the stripping or purging zone and carried by means of the hydrogen containing gas to the reaction zone. In such a system, the pre-reduction can be effected with a dense or lean phase of fluidized catalyst, the only requirement being the prescribed period of pre-reduction be used.

The physical form of the catalyst involved in the pretreatment operation will usually be determined by the type of system which is being used for the reforming operation. Accordingly, the catalyst may be used in the form of lumps, granules, pellets or finely divided material, depending upon the type of process used in the reforming of light hydrocarbon oil. In the case of a fixed bed reforming system, it is desirable to pretreat the catalyst, after it has been regenerated by an oxygen containing gas, without transferring the catalyst from the processing vessel. In effect, the cycles of operation would involve a reaction phase, regeneration phase and then a pretreatment phase, with or without suitable purging at appropriate intervals during operation. In a moving bed system, it is preferred to employ a separate pretreatment vessel for the purpose of conditioning the catalyst before use in the reaction zone. This involves transferring the catalyst from the regeneration zone to a pretreating zone, and then transferring the catalyst to the reaction zone. The use of a separate vessel for pretreating applies to a fluid or non-fluid system involving the moving bed technique.

As previously indicated, the pretreatment of molybdenum oxide catalyst results in higher yields of reformed liquid of high octane quality. The material to be reformed is a light hydrocarbon oil and includes, for example, gasoline, naphtha and kerosene. The light hydrocarbon oil has an initial boiling point of about 85° to about 325° F., and an end point of about 300° to about 675° F. In the case of reforming a naphtha fraction, it is preferred to employ a naphtha having an initial boiling point of about 200° to about 250° F., and an end point of about 300° to about 450° F. Generally, the light hydrocarbon oils to be reformed have a Watson characterization factor of about 11.50 to about 12.00. The feed material can be one which is a straight run or virgin stock, a cracked stock derived from a thermal or catalytic cracking operation or a mixture or blend of straight run and cracked stocks. Accordingly, the octane number of the feed material can range from about 0 to about 55 CFRR clear, and have an olefin content of 0 to about 100 mol per cent. The light hydrocarbon oil can be derived from any type of crude, and thus it can contain sulfur in the amount of about 0.01 to about 3.0% by weight.

The light hydrocarbon oil is reformed under conditions which can involve the net consumption or net production of hydrogen. A system involving the net production of hydrogen is commonly referred to as hydroforming, and it is operated under such conditions that the quantity of hydrogen produced is sufficient to sustain the process without need of extraneous hydrogen. Generally, for the reforming of light hydrocarbon oils, a temperature of about 750° to about 1100° F. is employed. At this temperature, the pressure of the operation is generally maintained at about 50 to about 1000 p. s. i. g. The quantity of oil processed relative to the amount of catalyst employed is measured in terms of the weight space velocity, that is, the pounds of oil feed on an hourly basis charged to the reaction zone per pound of catalyst which is present therein. The weight space velocity can vary from about 0.05 to about 10. The quantity of hydrogen which is added to the process is usually measured in terms of the standard cubic feet of hydrogen (measured at 60° F. and 760 mm.) per barrel of oil feed charged to the reforming operation (1 barrel= 42 gallons). On this basis, the hydrogen rate is about 500 to about 50,000 s. c. f. b., preferably about 1000 to 20,000 s. c. f. b. Another method of indicating the quantity of hydrogen which can be present during the hydroforming operation is by means of hydrogen partial pressure. In this regard, the hydrogen partial pressure is about 15 to about 950 p. s. i. a.

In a hydroforming operation, the conditions fall within the ranges specified hereinabove, however, they are selected on the basis of obtaining a net production of hydrogen. Accordingly, a hydroforming process involves preferably a temperature of about 850° to about 1050° F.; a pressure of about 50 to about 500 p. s. i. g.; a weight space velocity of about 0.1 to about 2; a hydrogen rate of about 1000 to 7500 s. c. f. b. and a hydrogen partial pressure of at least about 100 p. s. i. a. and up to the point at which hydrogen is consumed.

The reforming operation can be conducted with or without small amounts of water. Generally, the water is introduced as a vapor with the hydrogen containing gas, and/or as a liquid in the oil feed in the appropriate quantity, and/or it can be injected into the pretreated catalyst stream flowing to the reaction zone, and/or it can be injected directly into the catalyst bed of the reaction zone at a point distant or in proximity to the point of introduction of the oil feed. Generally, about 0.1 to about 3 mol per cent of water, based on the amount of hydrogen which is added to the reaction is employed in this process. The optimum quantity of water used for the reforming process increases with the reforming temperature.

Due to the reforming operation, the molybdenum oxide catalyst becomes contaminated with carbonaceous material which lowers its catalytic activity undesirably. Hence, the catalyst is subjected to a regeneration treatment which involves contacting same with an oxygen containing gas, e. g., oxygen, air, diluted air having about 1% to about 10% oxygen by volume, etc., at a temperature of about 600° to about 1250° F., preferably about 950° to about 1150° F. The regeneration is effected at atmospheric pressure or an elevated pressure of about 50 to about 1000 p. s. i. g. Prior to regeneration, the catalyst contains about 1 to about 10% by weight of carbonaceous material, and due to the regeneration of the catalyst, the carbonaceous material content is reduced to zero content or up to about 1% by weight. It is desirable to remove as much carbonaceous material as is economical, because at times the material which is deposited on the catalyst undesirably tends to cover the active molybdenum oxide centers, and thus render less effective the pretreatment operation. Consequently, in such instances, the ideal situation is to burn off all the carbonaceous material deposited on the catalyst.

The reforming operation can be accomplished using a fluid or non-fluid technique, involving either a fixed bed or a moving bed system. In the case of a fixed bed operation, at least two processing vessels are employed in order that one vessel is under regeneration and/or pretreatment, while the other vessel is processing the light hydrocarbon oil to be reformed. In the commercial operations of the present day, usually, four processing vessels are employed. This is also suitable in the present invention, because it provides for larger quantities of material to be reformed. Normally, in the fixed bed system, the reaction takes about 1 to about 24 hours, the regeneration takes about 0.25 to about 8 hours and the pretreatment operation can require about 0.1 to about 2 hours. In a fluid moving bed system, a finely divided catalytic material having a particle size in the range of about 5 to about 250 microns, more usually, about 10 to about 100 microns, is employed. A mass of the finely divided material is fluidized by the upward flow of gaseous or vapor materials which have a superficial linear velocity of about 0.1 to about 50 feet per second, more usually, about 0.1 to about 6 feet per second. In commercial operations, it is preferred to employ a superficial linear gas velocity of about 0.3 to about 2 feet per second. These linear gas velocities can exist in any of the processing vessels, namely, the reactor, the regenerator or the pretreating vessel. Furthermore, the specified linear gas velocities can provide either a lean or dense phase of fluid mass. Usually, it is preferred to employ a dense phase, because it provides a more intimate contact between the gas and/or vapor and the catalyst particles. The relative rates of catalyst being circulated and the oil being charged to the reaction zone are usually termed the catalyst to oil ratio, on a weight basis. Generally, in a moving bed system, the catalyst to oil ratio is about 0.05 to about 20. For commercial operations, it is preferred to employ a catalyst to oil ratio of about 0.3 to about 4.

In order to more fully describe the present invention, reference will be had to the accompanying drawing.

The drawing is a schematic diagram of a test unit 10 employed in evaluating the present invention.

In the accompanying drawing, hydrogen was supplied from source 5 and it passed into a rotometer 6 wherein the rate of hydrogen was measured. The measured hydrogen flowed from the rotometer to a valved line 8 and thereafter it passed to one of the circuits, namely, a circuit involving the removal of oxygen and water from the hydrogen gas stream and the other circuit which by-passed the oxygen removal system going directly to a wet test meter. Water was added to either stream of hydrogen gas in the desired quantity. When it was desired to produce dry hydrogen, the hydrogen flowed into line 10 which contained a valve 11 in an open position. The processing of the hydrogen through the other circuit involved passing the hydrogen through a line 12 which contained a valve 14. The hydrogen in line 10 flowed into a deoxo unit 16 comprised of palladium on aluminum oxide wherein oxygen removal was effected. Following the deoxygenation step in vessel 16, the hydrogen passed from the bottom thereof into a line 18 which was connected to the bottom end of a dryer 20 having present therein anhydrous calcium sulfate for the removal of moisture in the hydrogen gas. The dried hydrogen gas passed overhead from dryer 20 into an overhead line 21 and then it was measured by means of a wet test gas meter 23. A hydrocarbon mixture similar to the charge naptha was used in the west test gas meter instead of water. Since the hydrogen gas might absorb a small amount of water which might be present in the hydrocarbon mixture in the gas meter, it was passed through a line 25 which was connected to a second dryer 26 containing anhydrous calcium sulfate for the removal of water. The hydrogen gas stream was discharged from the top of dryer 26 through a line 28 which joined with a line 29. The deoxygenated gas was then passed through line 34 to the water saturator 37, wherein the desired concentration of water vapor was supplied. If no water was desired, the dry deoxygenated hydrogen by-passed the saturator through line 42.

In the event that it was desired to incorporate a predetermined quantity of water vapor into the hydrogen gas stream, without removing traces of oxygen beforehand, valve 11 in line 10 was kept in a closed position and valve 14 in line 12 was open. In this case, the measured hydrogen from rotometer 6 was first measured in a high pressure wet test gas meter 30. The measured hydrogen gas stream flowed first through line 29 in which there was situated a valve 32. In this type of an operation, valve 32 was maintained in a closed position and the hydrogen gas stream flowed through a line 34 in which there was installed a valve 35 in an open position. The hydrogen gas stream then passed into the bottom of a saturator 37 which contained water and was surrounded by an electric jacket to maintain the temperature at a desired level for obtaining the appropriate quantity of water vapor in the hydrogen gas stream. The moisture laden hydrogen gas passed overhead from saturator 37 into a line 39 in which there was installed a valve 40 in an open position. When a dry gas was employed for the pretreating operation, valves 35 and 39 were maintained closed in order to avoid moisture from getting into the hydrogen gas. Likewise, in such an operation, valve 32 in line 29 was kept open in order that the hydrogen gas by-passed saturator 37 by means of a line 42. The hydrogen containing gas then flowed through a line 43 which was connected to a main header 45 by which processing materials were charged to the reaction zone containing the catalytic material.

During the reaction cycle, the oil being processed was supplied from an oil feed tank 50 through a line 51 connected to the bottom thereof and thence transported by means of pump 53 through a line 55 which was connected to the main header 45. The mixture of hydrogen containing gas and oil flowed from header 45 into a line 57 which was connected to a coil 58 surrounding the reactor vessel 60. The coil 58 was wound downwardly across the length of the reactor for a coil length distance of 10 feet, and then upwardly across the same area of the reactor before entering the top of the reactor as line 62. The reactor was a cylindrical vessel having an internal diameter of 1.5 inches and a length of 1.5 feet. The catalyst material, being present in the form of $3/16$ inch pellets, occupied about 550 cc. of the reactor capacity. The reactant materials flowed downwardly over the catalytic material and thence passed from the reaction zone through a bottom line 64 which was connected to a condenser 65. The reaction product passed through an internal coil 66 which was surrounded by cooling water introduced via line 68 and then leaving the condenser via line 70. The condensed liquid product flowed from the bottom of the condenser through a line 72 which was connected to the top of high pressure receiver 73. Any gaseous material which was combined with the liquid product passed from receiver 73 into an overhead line 75 which was connected to a secondary cooler 76. In the secondary cooler any gaseous material which was condensable accumulated therein and was removed from the bottom thereof through a line 79. The normally gaseous material in the secondary cooler 76 passed overhead through a line 80. The liquid product in high pressure receiver 73 was discharged through the bottom thereof by means of a line 82 and it combined with the liquid product flowing through line 79 in line 83 in which there was installed a valve 84 for the purpose of maintaining the desired high pressure within receiver 73. The combined liquid product was then discharged from receiver 85 through a bottom valved line 87. Any gaseous material which was present with the liquid product was removed from the top of receiver 85 and it flowed through a line 89. The normally gaseous product from the secondary cooler 76 is passed through a pressure control valve 92 which is installed in the overhead line 80. The normally gaseous products in lines 80 and 89 were combined in line 94 before passing through a gas meter 95. The measured gaseous product then flowed through a line 97 before a portion thereof was taken as a gas sample through a valved line 98 and the remainder was vented through a line 99.

The temperature of the reaction zone was maintained by submerging the reactor with coil 58 into a molten lead bath maintained at a desired temperature. The molten lead bath is not shown in the schematic diagram. After the reaction cycle had run for the prescribed period of time, the catalytic material was regenerated by employing a regeneration gas constituting a mixture of nitrogen and air. In the case of regeneration at atmospheric pressure, air was introduced through a line 101 and nitrogen was supplied through a line 102, and both of these lines were connected to the main header 45, from which the material passed into line 57 prior to flowing through coil 58 circumscribing the reaction vessel. Following the reaction cycle, the stream of nitrogen passed through the reactor in order to remove as much of the reaction product wetting the catalyst as was possible. This was carried out at a temperature of about 875° to about 1050° F. and for a period of 45 minutes. Following the purging cycle, air was introduced along with the nitrogen in a quantity appropriate to obtain 2% by volume of oxygen. The temperature of the catalyst during this cycle of the operation was maintained at about 950° to about 1100° F. The concentration of air was increased during the regeneration until the oxygen concentration was about 8% by volume. The concentration of air was controlled at the lower concentrations to prevent the temperature from exceeding 1150° F. When it appeared that all combustible materials had been removed the catalyst was treated with 100% air for one-half hour. In the case of regeneration under superatmospheric pressure the procedure was similar to that described above. The passage of the regeneration gas continued for a period of about 4 hours. Following the regeneration of the catalyst, nitrogen, without previous treatment as to water content or oxygen containing compounds, was passed through the reactor 60 in order to purge same of any air or flue gas which might be present. The purging cycle with hydrogen was conducted at a temperature of about 875° to about 1050° F. and for a period of about 15 minutes. Following the nitrogen purge of the reactor, operation was commenced in the desired manner in order to evaluate the various factors of pretreatment and reaction conditions.

A naptha having the properties shown in Table I was evaluated in the test unit illustrated in the attached drawing.

Table I

| Feed designation | A |
|---|---|
| Gravity, °API | 55.4 |
| ASTM Distillation, °F.: | |
| IBP | 206 |
| 5 | 256 |
| 10 | 264 |
| 20 | 274 |
| 30 | 284 |
| 40 | 290 |
| 50 | 299 |
| 60 | 306 |
| 70 | 316 |
| 80 | 328 |
| 90 | 346 |
| 95 | 360 |
| E. P. | 381 |
| Reid vapor pressure, p. s. i. | 0.7 |
| K-characterization factor | 12.00 |
| Refractive idex, $n_D^{68}$ | 1.4229 |
| Aniline point, °F. | 133 |
| Octane number, CFRR clear | 30.2 |
| Aromatics, vol. percent (ASTM) | 12.5 |
| Olefins, mol. percent | 0.6 |
| Sulfur, wt. percent | 0.073 |
| Molecular weight | 125 |

The catalysts employed for the purpose of evaluation were prepared by the methods given below.

*Catalyst I*

The alumina-silica sol was made by reacting the following materials: 1500 lbs. of aluminum shot, approximately 7500 lbs. of used aluminum shot remaining in the tank from previous reactions, 3500 gallons of water, 280 lbs. of silicon tetrachloride, 7 lbs. of HgO, 50–100 lbs. of Hg from previous reactions, and 1460 lbs. of 88% formic acid. The alumina-silica sol after centrifuging contained 13% solids and had a specific gravity of 1.150 at 100° F. Approximately 175 lbs. of concentrated ammonium hydroxide was added to produce a thickening (gelation) of the sol (5 pH). This material was dried on a steam heated double drum dryer. The dried powder had an ignition loss of 57% and was calcined in a gas fired rotary drier at 1150° F., discharge temperature. The calcined powder was impregnated with ammonium molybdate solution by spraying the alumina in a Simpson mixer (edge runner) using 150 lbs. per batch. The wet paste was placed on stainless clad-carbon steel trays and calcined for 6 hours at 1470° F. in a box type oil fired 8' x 10' hearth furnace. The product analyzed 9.27% $MoO_3$ and 2.90% $SiO_2$.

The powder was stored in fiber drums. A sample was removed and calcined 6 hours at 1470° F. in a laboratory furnace. After pelleting into 3/16 inch pills using 2% aluminum stearate as a lubricant the catalyst was recalcined 3.5 hours at 1200° F. to burn off the stearate. A test unit charge of 460 cc. weighed 475 grams. The finished catalyst contained 9% by weight of $MoO_3$.

*Catalyst II*

The alumina employed in this catalyst showed by ignition loss a solids content of about 77.6%. 1290 grams of the alumina in powdered form (1000 grams of alumina) were placed on a large porcelain evaporating dish and impregnated with 122.2 grams of ammonium molybdate, $(NH_4)_6Mo_7O_{24}$, (99 grams of $MoO_3$) dissolved in 1110 cc. of distilled water. The catalyst mass was then dried in a Despatch oven for 20.75 hours at a temperature of 235° F. The dried powder was then calcined for 3 hours at 1200° F. in a Hoskins furnace. The calcined catalyst was white in color and weighed 1115 grams. 600 grams of the calcined powder were pelleted into 3/16 inch diameter pills. 409 grams of the pills were employed in the test unit for evaluating the catalyst. The finished catalyst analyzed 9.10% $MoO_3$, 2.36% $SiO_2$ and the remainder was essentially alumina.

*Catalyst III*

Catalyst II above was calcined for 6 hours at 1470° F. in a Hoskins furnace.

In all of the runs reported in Table II below, the preconditioning treatment with hydrogen was effected by the following procedure:

Hydrogen containing the required amount of water was employed to raise the pressure of the system from atmospheric to 275 p. s. i. g. The reaction system was maintained at 275 p. s. i. g. for 15 minutes under static conditions and then the pressure was reduced to 250 p. s. i. g. Hydrogen was then allowed to flow through the reaction zone at the rate of 11 standard cubic feet per hour for a period of ½ hour and at a temperature of 930° F. Following the preconditioning treatment the oil feed was charged to the system, and the run was considered started when a level was noticed in the gauge in the high pressure receiver 73 shown in the drawing.

Table II

| Run No. | 1 | 2 | 3 | 4 |
|---|---|---|---|---|
| Feed | A | A | A | A |
| Catalyst | I | II | II | III |
| Operating Conditions: | | | | |
| Temperature, °F | 930 | 930 | 930 | 930 |
| Pressure, p. s. i. g. | 250 | 250 | 250 | 250 |
| Space Velocity, $W_o/hr./W_c$ | 0.5 | 0.5 | 0.5 | 0.5 |
| $H_2$ Rate, S. C. F. B. | 5,000 | 5,000 | 5,000 | 5,000 |
| Mol percent $H_2O$ in hydrogen | 0.5 | 1.0 | 2.0 | 0.5 |
| Reaction time, hrs | 2 | 2 | 2 | 2 |
| Results: | | | | |
| Aniline Point, °F | 36 | 38 | 34 | 21 |
| Liquid Yield, Vol. percent | 85.8 | 64.8 | 64.9 | 69.1 |

It is to be noted from Table II above, that exceptionally better results are obtained when using Catalyst I, which involves using a calcination temperature of 1450° F., than when Catalyst II was employed. Catalyst II involved a calcination temperature of 1200° F. After calcining Catalyst II at a temperature of 1470° F. to produce Catalyst III the results obtained with the new catalyst were significantly better than the results shown with Catalyst II. It is to be noted that the octane number of the liquid product increases with the lowering of the aniline point. Hence, Catalyst III not only gave a high liquid yield, but it also produced a liquid having a higher octane number as shown from the decrease in the aniline point.

Having thus described the present invention by furnishing specific examples thereof, it is to be understood that no undue limitations or restrictions are to be imposed by reason thereof, but that the scope of the present invention is defined by the appended claims.

We claim:

1. A process which comprises treating a molybdenum oxide catalyst which was calcined at a temperature of at least about 1250° F. with a hydrogen containing gas at an elevated temperature, and then reforming a light hydrocarbon oil with the treated catalyst under suitable reforming conditions, thereby producing a reformed product.

2. A process which comprises treating a molybdenum trioxide catalyst which was calcined at a temperature of at least about 1250° F. with a hydrogen containing gas in the presence of a small amount of water at all elevated temperature, and then reforming a light hydrocarbon oil with the treated catalyst under suitable reforming conditions, thereby producing a reformed product.

3. A process which comprises a treating a molybdenum trioxide catalyst which was calcined at a temperature of at least about 1250° F. with a hydrogen containing gas in the presence of a small amount of water at an elevated temperature, and then reforming a light hydrocarbon oil with the treated catalyst under suitable reforming conditions in the presence of a small amount of water, thereby producing a reformed product.

4. A process which comprises treating a molybdenum trioxide catalyst which was calcined at a temperature of at least about 1250° F. with a hydrogen containing gas, in the presence of a small amount of water, at a temperature of about 850° to about 1050° F., then reforming a light hydrocarbon oil with the treated catalyst under suitable reforming conditions in the presence of a small amount of water, thereby producing a reformed product.

5. A process which comprises treating a molybdenum trioxide catalyst which was calcined at a temperature of at least about 1250° F. with a hydrogen containing gas, in the presence of about 0.1 to about 10 mol per cent of water, at a temperature of about 930° to about 975° F., and then reforming a naphtha fraction with the treated catalyst under suitable reforming conditions in the presence of a small amount of water, thereby producing a reformed product.

6. A process which comprises treating a molybdenum trioxide catalyst which was calcined at a temperature of about 1250° to about 1600° F. with a hydrogen containing gas at an elevated temperature, and then reforming a light hydrocarbon oil with the treated catalyst under suitable reforming conditions, thereby producing a reformed product.

7. A process which comprises treating a molybdenum trioxide catalyst which was calcined at a temperature of about 1250° to about 1600° F. with a hydrogen containing gas, in the presence of about 0.5 to about 6 mol per cent of water, at a temperature of about 850° to about 1050° F., and then reforming a naphtha fraction with the treated catalyst under suitable reforming conditions in the presence of about 0.1 to about 3 mol percent of water, thereby producing a reformed product.

8. A process which comprises treating a molybdenum trioxide catalyst which was calcined at a temperature of about 1250° to about 1600° F. with a hydrogen containing gas, in the presence of about 2 to about 6 mol percent of water, at a temperature of about 930° to about 975° F., and then reforming a naphtha fraction with the treated catalyst, at a temperature of about 750° to about 1100° F., a total pressure of about 50 to about 1000 p. s. i. g., a weight space velocity of about 0.05 to about 10, in the presence of added hydrogen in the amount of about 500 to about 20,000 s. c. f. b., in the presence of about 0.1 to about 3 mol percent of water, thereby producing a reformed product.

9. A process which comprises treating a molybdenum trioxide on alumina catalyst which was calcined at a temperature of about 1250° to about 1600° F. with a hydrogen containing gas, in the presence of about 0.1 to about 10 mol percent of water, at a temperature of about 850° to about 1050° F., and then reforming a naphtha fraction with the treated catalyst at a temperature of about 850° to about 1050° F., a total pressure of about 50 to about 500 p. s. i. g., a weight space velocity of about 0.1 to about 2, in the presence of added hydrogen in the amount of about 1000 to about 7500 s. c. f. b., thereby producing a reformed product.

10. A process which comprises treating a molybdenum trioxide catalyst which was calcined at a temperature of about 1250° to about 1600° F. with a hydrogen containing gas, in the presence of about 0.5 to about 6 mol percent of water, at a temperature of about 930° to about 975° F., and then contacting a naphtha fraction with the treated catalyst at a temperature of about 850° to about 1050° F., a weight space velocity of about 0.1 to about 2, a pressure of about 50 to about 500 p. s. i. g., in the presence of added hydrogen in the amount of about 1000 to about 7500 s. c. f. b., in the presence of about 0.1 to about 3 mol percent of water, thereby producing a reformed product.

11. A process which comprises treating a catalyst prepared by the method which comprises combining a precursor material for molybdenum trioxide with a carrier material and calcining the resultant mixture at a temperature of about 1250° to about 1600° F. for a period sufficient to convert said precursor material to molybdenum trioxide on the carrier material, with a hydrogen containing gas at an elevated temperature, and then reforming a light hydrocarbon oil with the treated catalyst under suitable reforming conditions to produce a reformed product.

12. The process of claim 11 wherein the precursor material for molybdenum trioxide is ammonium molybdate and the carrier material is alumina.

References Cited in the file of this patent

UNITED STATES PATENTS

| | | |
|---|---|---|
| 2,472,844 | Munday et al. | June 14, 1949 |
| 2,481,824 | Claussen et al. | Sept. 13, 1949 |
| 2,544,574 | Walker et al. | Mar. 6, 1951 |
| 2,692,846 | Oblad et al. | Oct. 26, 1954 |

UNITED STATES PATENT OFFICE

CERTIFICATE OF CORRECTION

Patent No. 2,768,933                                       October 30, 1956

William P. Burton et al.

It is hereby certified that error appears in the printed specification of the above numbered patent requiring correction and that the said Letters Patent should read as corrected below.

Column 3, line 41, for "pre-reducing" read -- reforming --; line 42, for "reforming" read -- pre-reducing --; column 11, line 24, after "comprises", strike out "a".

Signed and sealed this 14th day of May 1957.

(SEAL)
Attest:

KARL H. AXLINE
Attesting Officer

ROBERT C. WATSON
                                                                          Commissioner of Patents